INVENTOR.
GORDON H. PORATH
BY
Barnes, Kisselle, Raisch & Choate
ATTORNEYS

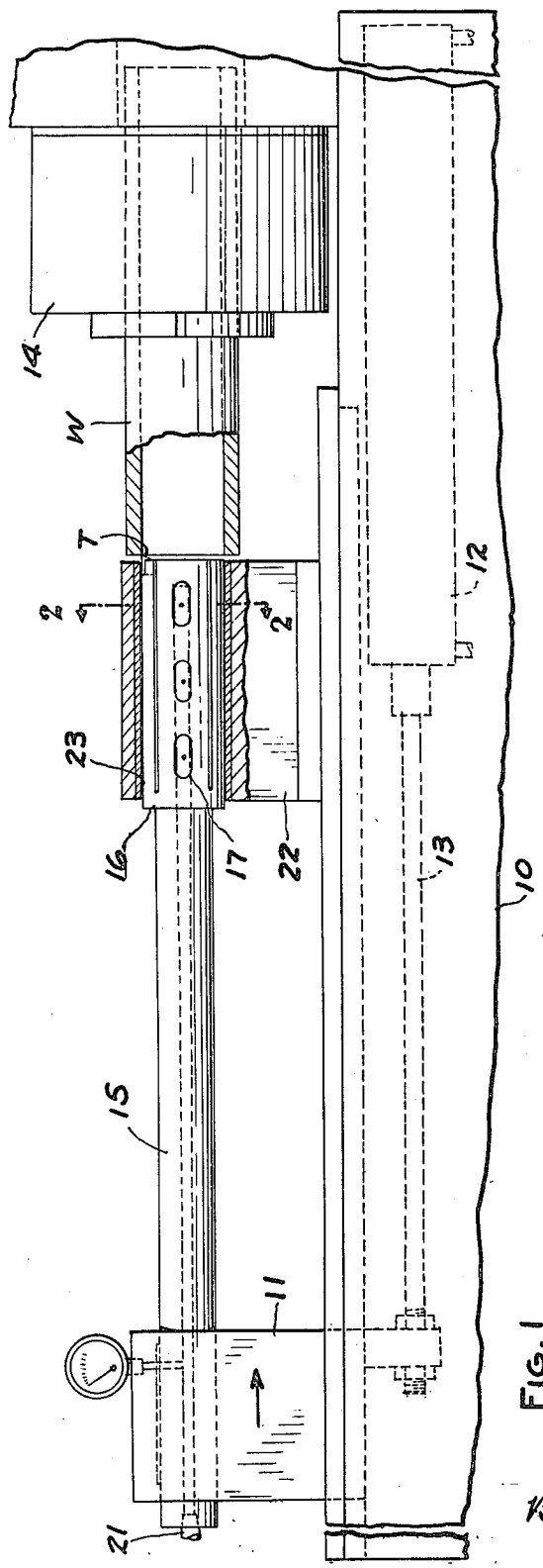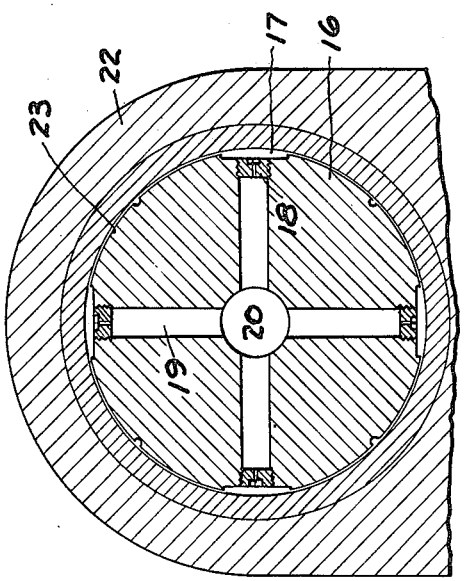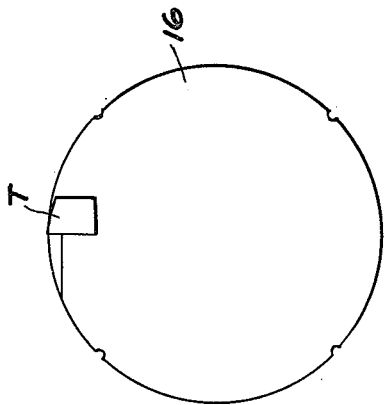

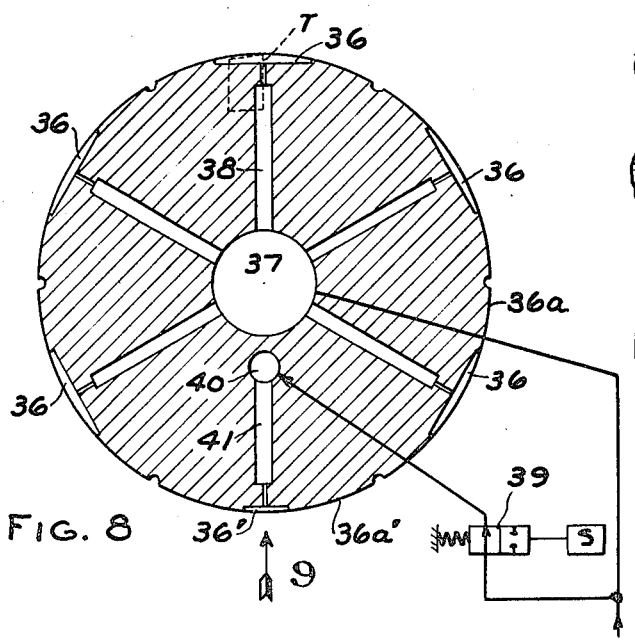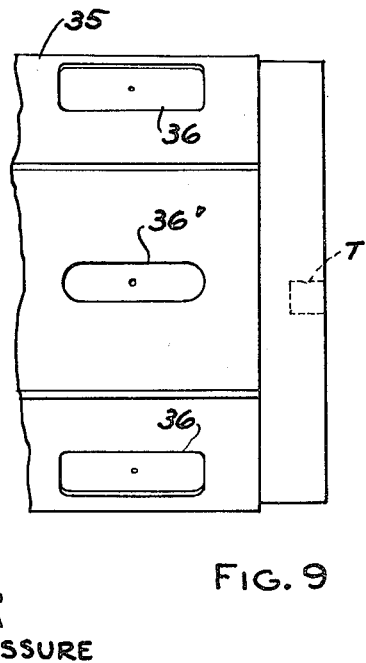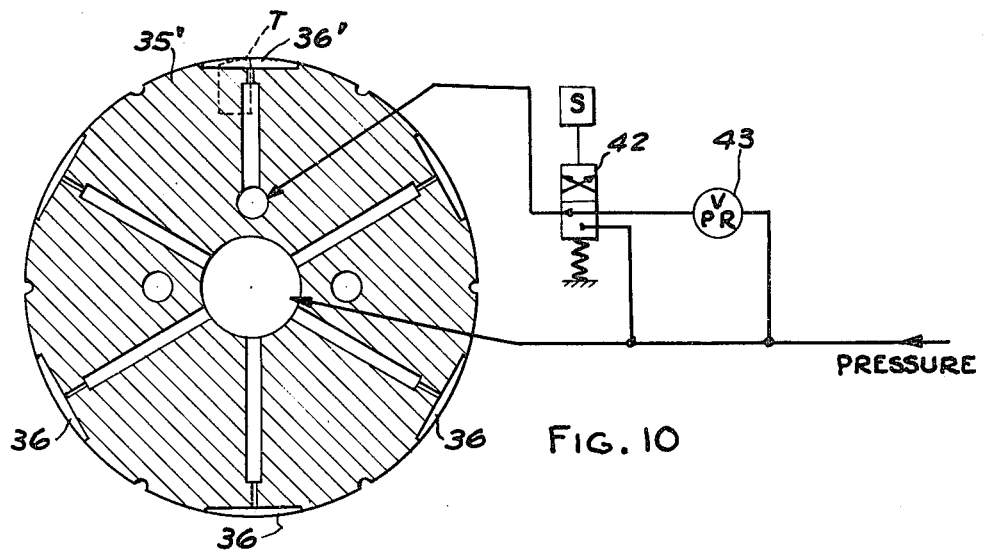

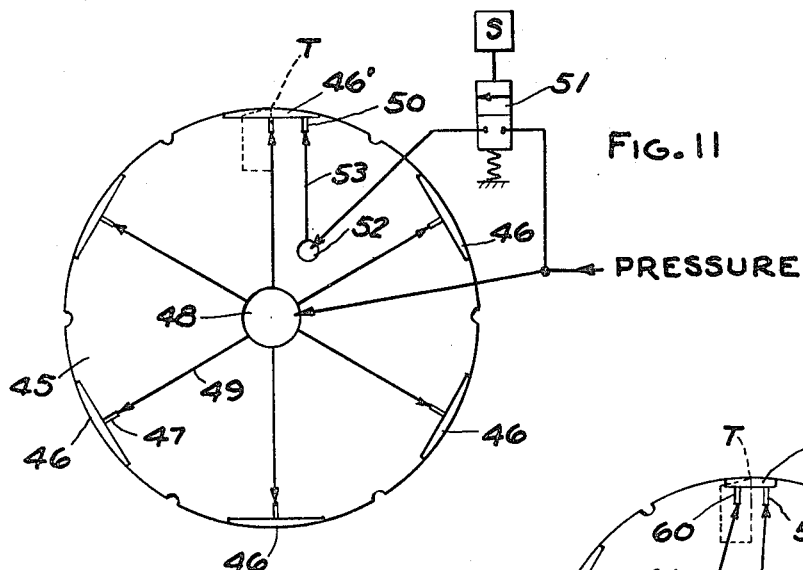
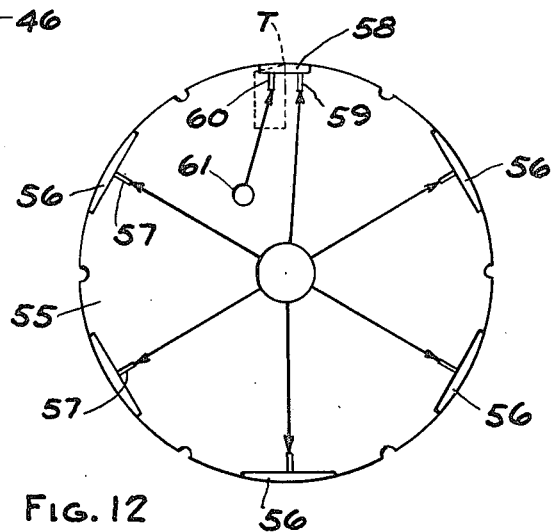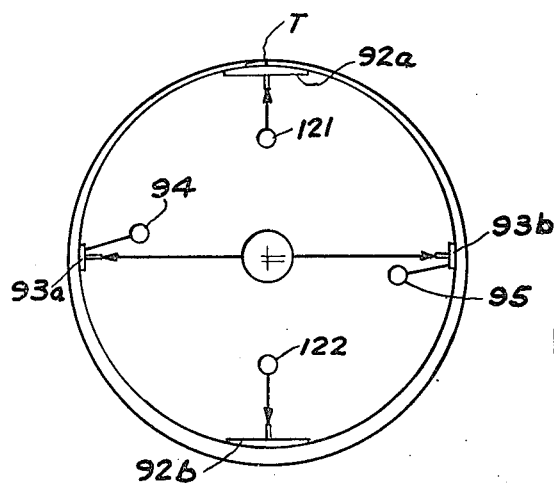

INVENTOR.
GORDON H. PORATH
BY
Barnes, Kisselle, Raisch & Choate
ATTORNEYS

INVENTOR.
GORDON H. PORATH 3,496,806
FINISH BORING
Gordon H. Porath, Brighton, Mich., assignor to The Babcock & Wilcox Company, New York, N.Y., a corporation of New Jersey
Filed Apr. 15, 1968, Ser. No. 721,305
Int. Cl. B23b 39/10, 29/04; F16c 7/04
U.S. Cl. 77—3                                      24 Claims

ABSTRACT OF THE DISCLOSURE

The finish boring apparatus disclosed herein comprises a support for the workpiece and a boring bar supported for movement axially of the workpiece which is rotated relative to the boring bar. The boring bar includes a portion spaced rearwardly from the tool that has a plurality of sets of circumferentially spaced pressure pads therein. A restrictor is associated with each pressure pad and a source is provided for supplying fluid under pressure to each restrictor. A guide member is supported adjacent the end of the workpiece and has an opening therethrough through which the boring bar extends as it is fed toward the workpiece. The diameter of the guide member is substantially equal to the diameter of the portion of the boring bar having the pressure pads therein. As the boring bar is fed toward the workpiece, the fluid flowing through the pressure pad flows in a thin film between the surfaces of the guide member and the portion of the boring bar having the pressure pads thereon so that the end of the boring bar is maintained in stable accurate relationship to the workpiece. As the boring bar is fed further into the workpiece, the tool continues to finish the bore and the sets of pressure pads are successively moved into cooperation with the finished bore so that the fluid now flows between the boring bar and the workpiece to continue to maintain the end of the boring bar in stable accurate relationship to the workpiece.

---

This invention relates to finish boring and particularly to the finish boring of a workpiece having a deep, rough cut bore therein.

BACKGROUND OF THE INVENTION

In finish boring of workpieces with long internal bores, several problems are commonly encountered, including vibration at the tool point, sideways drift of the hole and excessive tool wear. These problems are all related and appear to originate from the same basic cause, which is that the boring head is inherently long, wobbly, and unsupported. This must necessarily be so, since the boring head must extend far into the work, in the case of such parts as gun tubes, a distance not less than twenty or more times its diameter. Another potential source of sideways drift is inability to set initial direction of the bored hole accurately. It is common practice to allow the tool to enter the hole by way of a target bushing to obtain initial alignment, but if the tool hole is at all loose or worn or not perfectly circular, an initial angle can be added to the starting alignment which will thereafter worsen as the boring operation proceeds.

The present method of guiding boring tools is to provide a wood-pack guiding wear shoe behind the tool, set to the tool boring diameter. This can be either fixed, adjustable or spring loaded. The use of such shoes has disadvantages which are the rapidity with which both shoes and tooling wear, the expense of repacking them and their inability to suppress tool vibration or to maintain alignment. They cannot be said to provide a satisfactory solution to the problem.

Since nothing can be done about the long overhang which is the result of having to bore a long way into the work, or about the inadequate stiffness of the support bar which is the result of the limitation on diameter of the support imposed by that of the hole, any improvement in this type of equipment must be directed toward improving the stiffness and freedom from vibration of the guiding head itself, and this is the area toward which the present invention is directed. It should be noted that any decrease in vibration will also reduce the wear rate of the tool.

It would also be very desirable to be able to bore deep holes without having a drawback line when the tool is retracted; to know when to go from rapid to feed in entering the work for a later pass after a tool has become dull without the long delay if the travel speed is lowered to the feed rate too soon or the risk of breaking or prematurely dulling a tool or scoring the workpiece if the travel speed is lowered too late; and to be able to exercise open loop or feedback control on hole diameter to continuously correct for tool wear.

Of course, any such improvements in the art of deep hole finish boring would, with suitable adaptation of a target bushing, be applicable to finish boring of holes of ordinary or of intermediate depth, in varying degrees.

Among the objects of the invention are to provide a finish boring apparatus which will initially enter the rough bore in proper relationship and will continue to maintain a stable accurate relationship of the finish bore with respect to successively finished portions of the bore so that the overall final bore will be concentric throughout.

Further objects of the invention include providing a finish boring apparatus which is applicable to very long bores, which will actively suppress tool point vibration, which will not generate vibration from frictional interaction with the workpiece or target bushing during the guiding process, and which can be controlled to eliminate the drawback line with single point tooling.

Additional objects of the invention are to provide a finish boring apparatus and control system which will sense and correct for tool wear and which will sense and signal the appropriate time for transition from rapid advance to feed rate of the tool head.

SUMMARY

The finish boring apparatus disclosed herein comprises a support for the workpiece and a boring bar supported for movement axially with respect to the workpiece which is rotated relative to the boring bar. The boring bar includes a portion spaced rearwardly from the tool that has a plurality of sets of circumferentially spaced pressure pads therein. A restrictor is associated with each pressure pad and a source is provided for supplying fluid under pressure to each restrictor. A guide member which may or may not be rotatable is supported adjacent the end of the workpiece and has an opening therethrough through which the boring bar extends as it is fed toward the workpiece. The diameter of the guide member is substantially equal to the diameter of the portion of the boring bar having the pressure pads therein. As the boring bar is fed toward the workpiece, the fluid flowing through the pressure pad flows in a thin film between the surfaces of the guide member and the portion of the boring bar having the pressure pads thereon so that the end of the boring bar is maintained in stable accurate relationship to the workpiece. As the boring bar is fed further into the workpiece, the tool continues to finish the bore and the sets of pressure pads are successively moved into cooperation with the finished bore so that the fluid now flows between the boring bar and the workpiece to con-

3 tinue to maintain the end of the boring bar in stable accurate relationship to the workpiece.

DESCRIPTION OF THE DRAWINGS

FIG. 1 is a part sectional side elevational view of an apparatus embodying the invention.

FIG. 2 is a fragmentary sectional view on an enlarged scale taken along the line 2—2 in FIG. 1.

FIG. 3 is an end view of the boring bar shown in FIG. 1.

FIG. 8 is a transverse sectional view of a further modified form of the invention.

FIG. 9 is a fragmentary side elevational view taken in the direction of the arrow 9 in FIG. 8.

FIG. 10 is a partly diagrammatic transverse sectional view of a further modified form of the invention.

FIG. 11 is a diagrammatic view of a further modified form of the invention.

FIG. 12 is a diagrammatic view of a further modified form of the invention.

FIG. 17 is a partly diagrammatic sectional view taken along the line 17—17 in FIG. 15.

DESCRIPTION

Figure 4:
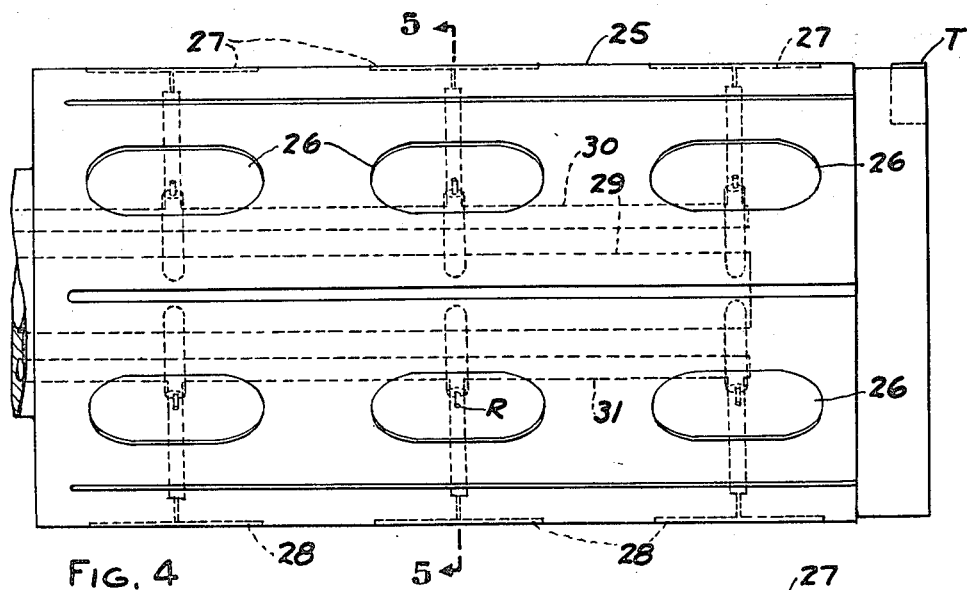
FIG. 4 is a fragmentary side elevational view of a modified form of the invention.

Referring to FIG. 1, the finish boring apparatus embodying the invention comprises a base 10 along which a slide 11 is adapted to be moved by a cylinder 12 that has its shaft 13 connected to the slide. The slide is preferably supported by hydrostatic bearings in the manner shown in the patent to Gordon Porath 3,231,319 issued Jan. 25, 1966. The chuck 14 is rotatably supported on the base 10 for holding a workpiece W that has a rough bore therein. The slide 11 supports a boring bar 15 that has a tool T mounted on the end thereof. The portion or head 16 adjacent and rearwardly of the tool T has an accurately formed cylindrical surface thereon and a plurality of circumferentially spaced sets of pressure pads or recesses 17 therein. Each pressure pad is provided with a restrictor 18 which is preferably in the form of a capillary tube. Radially extending passages 19 communicate with an axial passage 20 through the boring bar 15 to the end of the boring bar. Fluid under pressure, preferably hydraulic fluid comprising the coolant that is utilized in the cutting operation, is introduced through an opening 21.

A guide member 22 is fixed on the base and has an accurately formed cylindrical surface 23 that is substantially equal to the diameter of the portion 16 of the boring bar.

Initially the apparatus is set up as shown in FIG. 1 with the end of the boring bar in the guide member 22 and the tool T projecting outwardly therefrom. In this position when fluid under pressure is supplied through opening 21 and flows through the passageways 20 and 19 and restrictors 18 to the pressure pads, it thereafter flows outwardly in a thin film between the surfaces of the portions 16 and 23 of the guide member. This maintains the end of the boring bar in stable accurate relationship with respect to the guide member 22. As the workpiece W is rotated and the boring bar 15 is translated axially by actuation of the cylinder 12, the tool T finishes the bore of the workpiece. As the boring bar is moved into the workpiece, successive sets of pressure pads 17 will move adjacent portions of the bore which have been finished and the fluid flowing between the surfaces of portions 16 and the finished surface of the bore in the workpiece W will hold the tool in stable accurate relationship with respect to the workpiece W and out of metal-to-metal contact therewith. Further movement of the boring bar will cause the boring bar to move out of registry with the guide member so that it is guided only by the interrelationship of the pressure pads in the fluid flowing therethrough between the surfaces of the portions 16 and the finished surface of the workpiece W.

The number of sets of pressure pads 17 is preferably at least three and each set preferably comprises six pressure pads 17. Best results are achieved when the finish bore of the workpiece W is substantially equal to the diameter of the portion 16.

The term "substantially equal to the diameter" as utilized in connection with the diameter portions 16, surface 23 and finish bore of the workpiece W is intended to mean when the space between these surfaces ranges between two thousandths (0.002) of an inch and one ten-thousandth (0.0001) of an inch and preferably between one thousandth (0.001) of an inch and one ten-thousandth (0.0001) of an inch.

Figure 5:
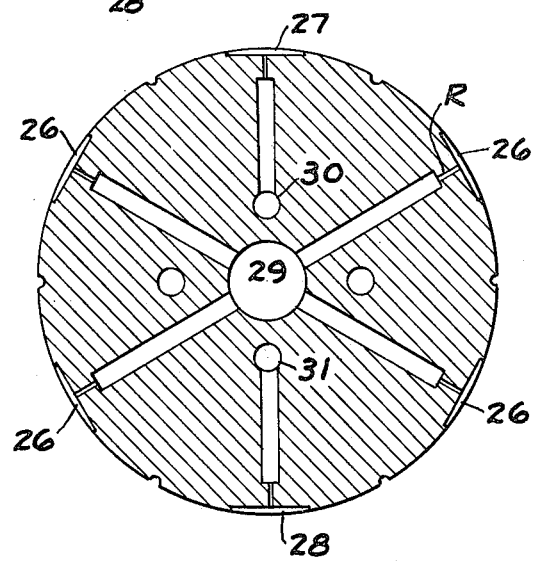
FIG. 5 is a sectional view taken along the line 5—5 in FIG. 4.

In the form of the invention shown in FIGS. 4 and 5, the head 25 of the boring bar is formed with at least three longitudinally spaced sets of pressure pads. Each set of pressure pads comprises at least six pressure pads formed in groups including two pairs of diametrically opposed pressure pads 26 and diametrically opposed pressure pads 27, 28. Restrictors R are associated with each of the pressure pads. The restrictors associated with pressure pads 26 are one size, the restrictors associated with pressure pads 27 are smaller in diameter producing a greater restrictive effect than the restrictors associated with pressure pad 26 and the restrictor associated with pressure pad 28 is larger in diameter producing a less restrictive effect than the restrictors associated with the pressure pads 26. In addition the pressure pads 26 are fed from a central axial bore 29 while each of the pressure pads 27, 28 have their own separate feeds through parallel axially extending bores 30, 31.

Figure 6:
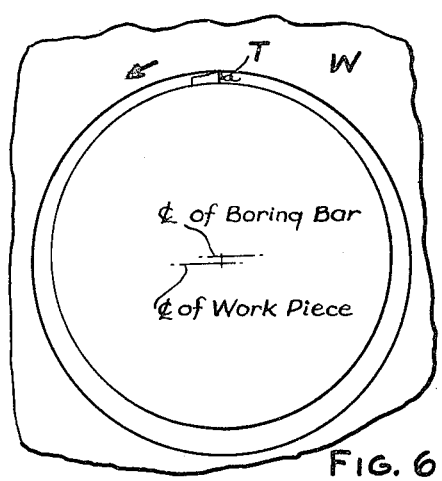
FIGS. 6 and 7 are diagrams showing the relative position of the workpiece and tool in different operative positions in the form of the invention shown in FIGS. 4 and 5.
Figure 7:
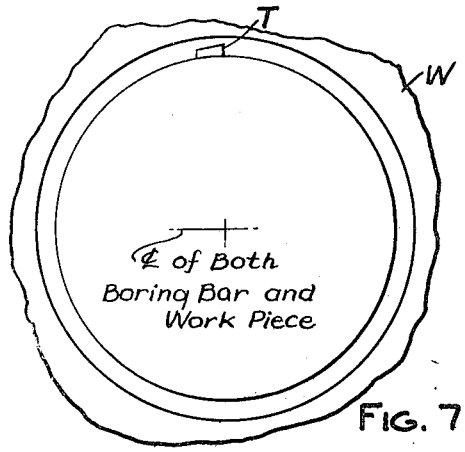

Valves are associated with each of the bores 29, 30 and 31 so that the fluid supplied to each of the bores and in turn the associated pressure pad can be controlled. With all of the valves open so that fluid is applied to all of the pressure pads, the less restrictive action of the restrictor associated with the pressure pad 28 produces a force that tends to maintain the boring bar in eccentric relation to the guide member 22 and in turn the workpiece so that the tool T is in cutting position as shown diagrammatically in FIG. 6. If however the fluid supplied to the pads 27, 28 is shut off, then the pressure pads 26 tend to center the boring head and in turn the tool moving it out of contact with the workpiece so that the tool is retracted, as shown in FIG. 7.

In the form of the invention shown in FIGS. 8 and 9 the head 35 of the boring bar is formed with longitudinally spaced sets of pressure pads. Each set includes equally spaced pads 36, 36'. The pads 36 are of equal size and have restrictors associated therewith of equal size so that the pressure in the pads is identical. The pressure pad 36' is of smaller size but has a larger restrictor so that average pressure across the small pressure pad 36' and its associated land area 36a' is equal to the average pressure across any pressure pads 36 and associated land area 36a. Fluid is supplied to the pressure pads 36 through axial bore 37 and radial passages 38 and to the pressure pad 36' through a solenoid operated valve 39, axial passage 40 and radial passage 41. When fluid is supplied to all of the pressure pads 36, 36', the boring head 35 is maintained in stable accurate centered relationship with respect to the guiding member 22 and the workpiece as the boring bar is moved into the workpiece. If however the valve 39 is operated to interrupt the flow to the pressure pad 36' while the workpiece continues to rotate, hydrodynamic film pressure of smaller magnitude than the average pressure when pressurized from valve 39, but of still appreciable magnitude will be produced by rotation. It will be developed across lands 36a' adjacent to pressure pad 36'. This will tend to move the boring bar head 35 into eccentric relation to the workpiece or downwardly as viewed in FIG. 8 moving the tool T out of contact with the workpiece so that the boring bar can be retracted.

In order to provide for retraction of the tool in the form of boring head 35' somewhat similar to that shown in FIGS. 8 and 9 for use when the workpiece is not rotating relative to the tool, the schematic shown in FIG. 10 may be associated with the head 35' which comprises a four-way valve 42 associated with the pressure pad 36', which is of the same dimensions as pad 36, so that it can selectively supply either full pressure or reduced pressure to the pressure pad 36' through a pressure reducing valve 43. In normal operation the valve 42 is positioned so that a reduced pressure is supplied to the pressure pad 36'. When it is desired to retract the tool, the valve 42 is set to supply full pressure to the pad 36' tending to establish a balanced force that centers the head and so moves the tool T away from the workpiece or downwardly as viewed in FIG. 10.

In the form of the invention shown in FIG. 11, which is intended for use when the tool is set so that cutting takes place when the head is centered, the boring head 45 is provided with longitudinally spaced sets of pressure pads. Each set comprises equally circumferentially spaced pressure pads 46, one of which is designated 46' and is adjacent the tool T, and associated restrictors 47 of equal size. The fluid is supplied to each pressure pad through a central axial bore 48 and radial passages 49 from a source of fluid pressure. The pressure pad 46' which is adjacent the tool T also is fed by an auxiliary restrictor 50 which is supplied with pressure selectively by a valve 51 through an axially extending passage 52 and radial passage 53. The restrictor 50 is larger than the restrictors 47. In normal operation the valve 51 is set so that there is no fluid flow through restrictor 50 so that the boring head is maintained in centrally disposed position with respect to the guiding head 22 and the workpiece as it enters the workpiece. When it is desired to retract the tool, the valve 51 is actuated to supply fluid to the restrictor 50 increasing the pressure in the pressure pad 46' thereby moving the boring head 45 into eccentric relationship with respect to the workpiece so that the tool can be retracted without contact with the workpiece.

In the form of the invention shown in FIG. 12 the boring head 55 is provided with longitudinally spaced sets of pressure pads 56 as in the previous forms of the invention. Each set of pressure pads comprises circumferentially spaced pads 56 and associated restrictors 57 of equal size and a pressure pad 58 of smaller size having a restrictor 59 such that the pressure in the pressure pad 58 is less than in the pressure pads 56 when fluid is supplied to each of the pressure pads and so that when fluid is supplied to each of the pressure pads the boring head is maintained in eccentric relation holding the tool against the workpiece. An auxiliary restrictor 60 supplied with fluid through an axial bore 61 and a valve such as valve 51 in FIG. 11 is provided. When it is desired to retract the tool, fluid is supplied to the restrictor 60 increasing the pressure in the pad 58 to move the boring head into centered relation to the workpiece and to thereby retract the tool out of contact with the workpiece.

Figure 13:
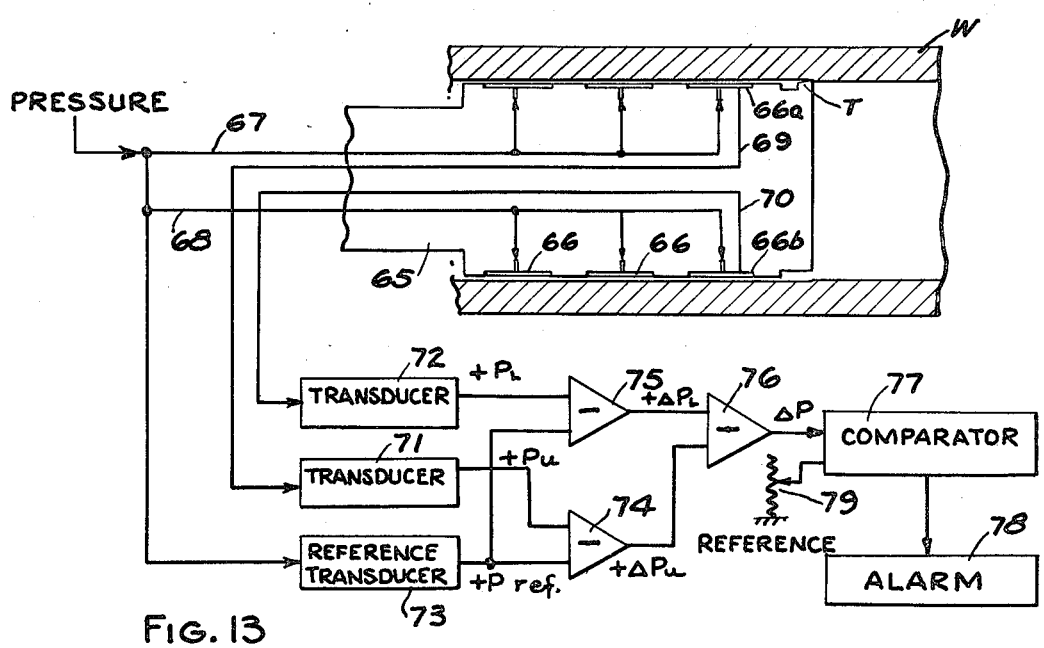
FIG. 13 is a part sectional diagrammatic view of a further modified form of the invention.

In the form of the invention shown in FIG. 13, the boring head 65 is provided with longitudinally spaced sets of circumferentially spaced pressure pads 66, each of which has a restrictor associated with it and to which fluid under pressure is supplied through the lines 67, 68. The pressure in the pad 66a which is circumferentially oriented with respect to the tool is monitored through a line 69 and the pressure in the diametrically opposite pads 66b is monitored through a line 70. Lines 69, 70 are associated with two transducers 71, 72, respectively. A reference pressure passes through a transducer 73. The output of the reference transducer 73 is subtracted from the output of the transducers 71, 72 by differential amplifiers 74, 75 and the differential pressure between the two output signals from amplifiers 74, 75 are compared, that is, one is subtracted from the other in a differential amplifier 76 and compared in a comparator 77 to energize an alarm 78 in the event that the pressure differential between the pad 66a and 66b exceeds a predetermined amount as established by a reference 79 indicative of tool wear.

Figure 14:
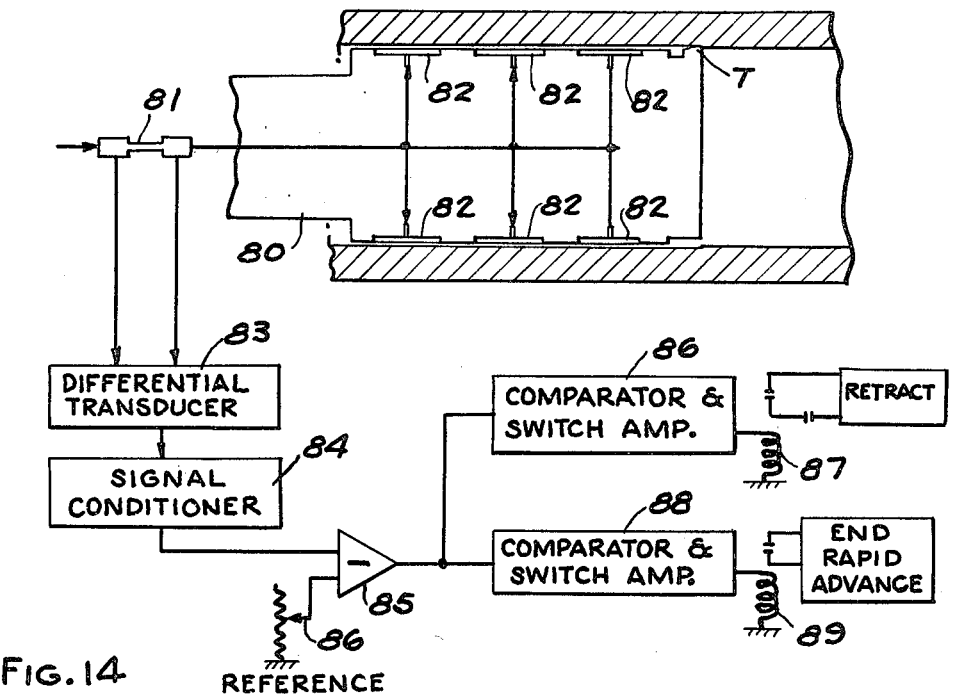
FIG. 14 is a part sectional diagrammatic view of a further modified form of the invention.

In the form of the invention shown in FIG. 14, a similar sensing of tool wear is achieved as in FIG. 13 except that the system is responsive to changes in fluid flow rather than changes in fluid pressure. As shown in FIG. 14, fluid is supplied under pressure through an orifice or other restrictor 81 to longitudinally spaced sets of circumferentially spaced pressure pads 82 which have restrictors associated therewith. As the tool T wears, additional fluid will flow to the pressure pads. The increased fluid flow is sensed by a greater pressure drop across orifice 81 as measured by a differential transducer 83. Orifice 81 must be large enough (that is, it must have a small enough change in pressure drop corresponding to the full range of flows encountered over the range of gaps expected) so that its pressure drop change does not interfere with the function of the bearing or cut down the output pressure and flow so as to mask the primary flow change being monitored. The output of the differential transducer passes to a signal conditioner 84 and a summer 85 which compares the signal with a reference 86. The output of the summer 85 is utilized to either retract the boring head 80, when used during the boring mode, or to stop the rapid advance of the boring head in the event the system has been energized as the boring head enters the workpiece and before it reaches the working position in the workpiece. As shown, a first comparator 86 is adapted to energize a relay 87 for retracting the boring head. A second comparator 88 is adapted to energize a relay 89 to end the rapid advance of the boring head. In both of these modes of operation, it is obvious that the axial distance between the tool T and the leading pad must be a minimum.

Figure 15:
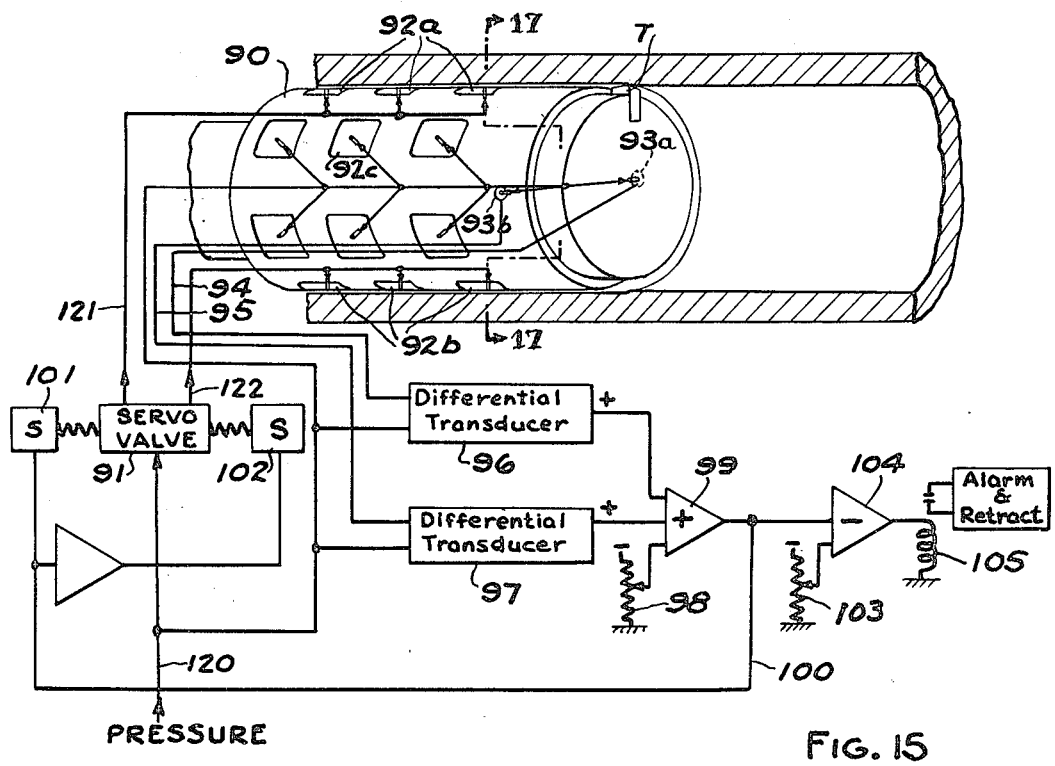
FIG. 15 is a part sectional diagrammatic view of a further modified form of the invention.

In the form of the invention shown in FIGS. 15 and 17, the boring head 90 has fluid supplied thereto to longitudinally spaced sets of circumferentially spaced pressure pads 92 and associated restrictors. The pressure pads are divided into three circumferentially spaced sets, namely, pressure pads 92a adjacent to tool, pressure pads 92b diametrically opposed to the tool and pressure pads 92c in the circumferential spaces between pads 92a, 92b. Pads 92c are supplied directly from the pressure line 120 and pads 92a and 92b from the differential output ports of servo valve 91, through lines 121 and 122, respectively.

Sensing pressure pads 93a and 93b (FIG. 17) are provided at 90° to the pads 92a and 92b and have restrictors associated therewith and lines 94, 95, respectively extending to differential transducers 96, 97. Differential transducers 96, 97 also receive inputs from the pressure pads 92c. The outputs of the differential transducers are summed with respect to a reference value from a reference 98 in a summer 99. If there is a net signal out of summer 99 indicating that there has been a decrease in gap due to tool wear, the signal is directed through a line 100 to operate the differential control solenoids 101, 102 and displace the servo valve laterally to supply unequal amounts of fluid pressure to pads 92a, 92b tending to shift the position of the boring bar so as to increase the cut. If the signal exceeds a predetermined value as set by a reference 103 and compared by summer 104, relay 105 is energized to actuate an alarm and retract the boring head.

Figure 16:
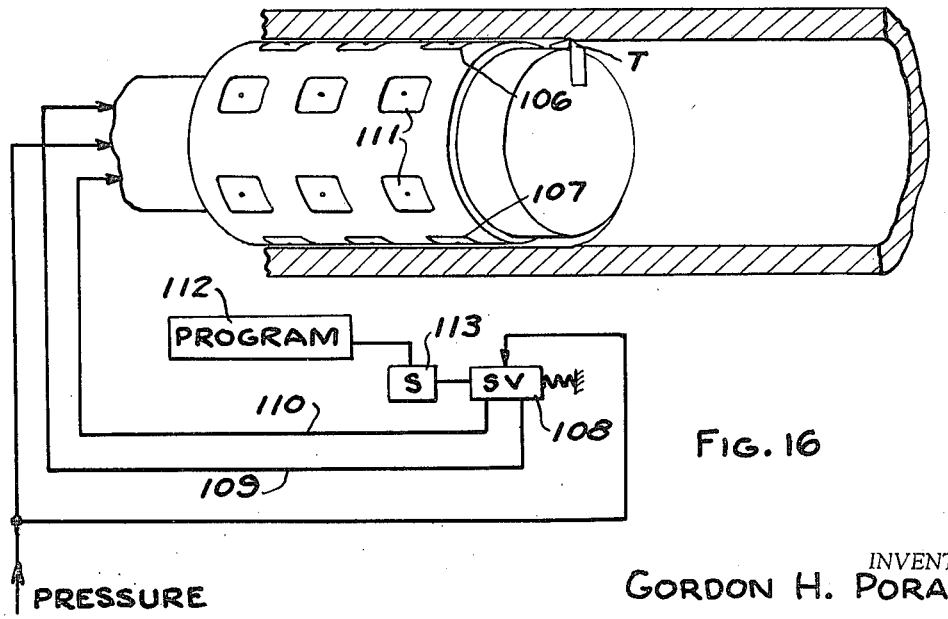
FIG. 16 is a part sectional diagrammatic view of a further modified form of the invention.

In the form of the invention shown in FIG. 16, the pressure pads 106 adjacent the tool T and 107 diametrically opposed from the tool T are supplied with pressure through a servo valve 108 and lines 109, 110 while the other circumferential pressure pads 111 are supplied with fluid pressure directly. A predetermined programmer 112 actuates a solenoid 113 for operating the servo valve. The programmer is set to compensate for anticipated tool wear as the machining operation continues so that the pressure in the pads 106, 107 is varied to always maintain the tool in the proper relative position to the workpiece, by increasing the pressure in the pads 107 and decreasing the pressure in the pads 106 sufficiently to bring the tool into the assumed proper position.

I claim:

1. In an apparatus for finish boring a workpiece having a rough bore, the combination comprising
   a workpiece support,
   a boring bar,
   means for mounting said workpiece support and said boring bar for relative axial and rotational movement,
   said boring bar having a means for supporting a tool on one end thereof,
   said boring bar having an area spaced rearwardly of the tool having a plurality of sets of circumferentially spaced pressure pads therein,
   a restrictor associated with each said pad,
   means for supplying fluid under pressure to each said restrictor whereby as the boring bar and workpiece are moved axially and rotatably relative to one another and the tool finishes the bore of the workpiece, said sets of pressure pads successively move into said bore and fluid flowing out of said pressure pads flows in a thin film between the area surrounding said pressure pads and the finished bore to hold said boring bar in stable accurate relation to the workpiece.

2. The combination set forth in claim 1 including an entry guide member adjacent the end of the workpiece,
   said entry guide member having an accurately formed opening therethrough,
   the size of said opening being substantially equal to the diameter of the portion of said tool having said pressure pads therein whereby as the tool is moved axially through said guide member, fluid flowing through said pressure pads flows in a thin film between the surface of said tool and said guide member to hold said boring bar in stable accurate relation to the workpiece as the boring bar enters the workpiece.

3. The combination set forth in claim 1 wherein said boring bar has at least three sets of pressure pads therein and each set comprises at least six pressure pads.

4. The combination set forth in claim 1 wherein the diameter of said portion of said boring bar having the pressure pads therein is substantially equal to the finished diameter of the workpiece defined by the tool of the boring bar.

5. The combination set forth in claim 1 including means for varying the fluid flow in at least one of the pressure pads in one of the sets of circumferentially spaced pressure pads.

6. The combination set forth in claim 1 including means for varying the flow in at least diametrically opposed pressure pads in at least one set of circumferentially spaced pressure pads.

7. The combination set forth in claim 1 wherein one of the pressure pads which is aligned in predetermined relation with the tool has a predetermined size and the remaining pressure pads have a different size,
   said one pressure pad having a larger restrictor than the other pressure pads such that in normal position the pressure in all of the pressure pads is equal,
   and means selectively controlling the flow to said one pressure pad.

8. The combination set forth in claim 7 wherein said last-mentioned means includes means for interrupting the flow to said one pressure pad.

9. The combination set forth in claim 7 wherein said last-mentioned means comprises means for modifying the flow to said one pressure pad.

10. The combination set forth in claim 1 wherein said pressure pads in any circumferentially spaced set are equal in size and the associated restrictors are equal in size,
    an auxiliary restrictor associated with one of the pressure pads which is aligned in predetermined relation with the tool,
    and means for controlling the flow of fluid through said auxiliary restrictor to said one pressure pad.

11. The combination set forth in claim 10 wherein said last-mentioned means is capable of interrupting the flow of fluid to said one pressure pad.

12. The combination set forth in claim 1 including an auxiliary restrictor associated with one of said pressure pads which is in alignment with the tool,
    and means for varying the flow of fluid to said one pressure pad through said auxiliary restrictor.

13. The combination set forth in claim 1 including means for comparing the pressure in the diametrically opposed pads which are aligned with the tool with the pressure in the remaining pads.

14. The combination set forth in claim 13 including means for producing an alarm signal in the event that said differential of pressure exceeds a predetermined value.

15. The combination set forth in claim 1 including means for comparing the flow in the pads aligned with and diametrically opposed to the tool.

16. The combination set forth in claim 15 including means for producing a signal in response to a predetermined pressure differential.

17. The combination set forth in claim 16 including means for producing a retract signal in response to said last-mentioned signal.

18. The combination set forth in claim 16 including means for producing a signal which stops rapid advance and begins feed at a cutting rate in response to said signal.

19. The combination set forth in claim 1 including a second auxiliary set of circumferentially spaced pressure pads and associated restrictors,
    means for sensing the pressure in said pads.

20. The combination set forth in claim 19 including means for modifying the flow to the first-mentioned pressure pads aligned with and diametrically opposed with the tool in response to the means for sensing the pressure in said auxiliary pads.

21. The combination set forth in claim 20 including means for controlling the flow of fluid to said aligned and diametrically opposed pads in unequal amounts.

22. The combination set forth in claim 1 including means for sensing the fluid pressure in said pressure pads.

23. The combination set forth in claim 1 including means for controlling the flow to said pressure pads in response to a predetermined program.

24. The combination set forth in claim 1 including means for varying the flow to said pressure pads in response to the variations in pressure therein due to tool wear.

References Cited

UNITED STATES PATENTS 3,382,739   5/1968   Jacobson _____ 77—3

GERALD A. DOST, Primary Examiner

U.S. Cl. X.R.

77—1, 57; 308—9